United States Patent
Yavid

(10) Patent No.: US 7,287,862 B2
(45) Date of Patent: Oct. 30, 2007

(54) COMPACT IMAGE PROJECTION MODULE

(75) Inventor: Dmitriy Yavid, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 303 days.

(21) Appl. No.: 11/061,692

(22) Filed: Feb. 18, 2005

(65) Prior Publication Data

US 2006/0187419 A1    Aug. 24, 2006

(51) Int. Cl.
G03B 21/26 (2006.01)
G03B 21/28 (2006.01)
G03B 21/00 (2006.01)
G03B 29/00 (2006.01)
G03B 23/00 (2006.01)

(52) U.S. Cl. .............. 353/37; 353/42; 353/43; 353/94; 353/98; 353/102

(58) Field of Classification Search .......... 353/30, 353/31, 42, 43, 94, 98, 99, 100, 101, 102, 353/119; 348/744, 789, 748; 359/201; 235/454, 235/462.45, 472.01
See application file for complete search history.

(56) References Cited

U.S. PATENT DOCUMENTS

| | | | |
|---|---|---|---|
| 6,655,597 B1* | 12/2003 | Swartz et al. | 235/462.45 |
| 6,802,451 B2* | 10/2004 | Yavid et al. | 235/472.01 |
| 6,832,724 B2* | 12/2004 | Yavid et al. | 235/454 |
| 6,945,652 B2* | 9/2005 | Sakata et al. | 353/30 |
| 2004/0017518 A1* | 1/2004 | Stern et al. | 348/744 |
| 2006/0126022 A1* | 6/2006 | Govorkov et al. | 353/31 |
| 2006/0126023 A1* | 6/2006 | Tan et al. | 353/31 |

* cited by examiner

Primary Examiner—Melissa Jan Koval
(74) Attorney, Agent, or Firm—Kirschstein, et al.

(57) ABSTRACT

A lightweight, compact image projection module, especially for mounting in a housing having a light-transmissive window, is operative for causing selected pixels in a raster pattern to be illuminated to produce an image of high resolution of VGA quality in monochrome, color or gray scale. Edge-emitting light emitting diodes are employed, together with mutually orthogonal cylindrical lenses, to render the module with a short, slim form factor.

17 Claims, 3 Drawing Sheets

COMPACT IMAGE PROJECTION MODULE

BACKGROUND OF THE INVENTION

1. Field of the Invention

The present invention generally relates to projecting a two-dimensional image in monochrome, gray scale or color and, more particularly, to increasing image brightness and reducing speckle noise, while maintaining low power consumption, high resolution, miniature compact size, quiet operation and minimal vibration.

2. Description of the Related Art

It is generally known to project a two-dimensional image on a screen based on a pair of scan mirrors which oscillate in mutually orthogonal directions to scan a laser beam over a raster pattern. See, for example, U.S. Pat. No. 6,655,597. However, the known image projection systems have limited resolution, typically less than a fourth of video-graphics-array (VGA) quality of 640×480 pixels. The physical size and power consumption of the known projection systems are relatively high, thereby rendering them impractical for use in miniature, hand-held, battery-operated applications. Also, the low scan rates of the scan mirrors generate objectionable noise and vibration during use. Speckle noise, which is caused by the coherent nature of laser light, is an omnipresent problem that detracts from good image quality. In the case of color images formed by laser beams of different wavelengths (colors), some laser sources, for example, red semiconductor single mode lasers have insufficient power to produce a color image of uniform brightness, and other laser sources, for example, green lasers, are not readily available.

SUMMARY OF THE INVENTION

Objects of the Invention

Accordingly, it is a general object of this invention to provide an image projection module that projects a sharp and clear, two-dimensional image of uniform brightness at a projection plane.

Another object of this invention is to minimize power consumption in such projection modules.

Still another object of this invention is to eliminate speckle noise in the image projected by such modules.

Yet another object of this invention is to reduce, if not eliminate, objectionable noise and vibration during operation.

An additional object is to provide a miniature, compact, lightweight, and portable image projection module useful in many arrangements of different form factors.

FEATURES OF THE INVENTION

In keeping with these objects and others which will become apparent hereinafter, one feature of this invention resides, briefly stated, in an image projection module for projecting a two-dimensional image extending along mutually orthogonal longitudinal and transverse directions at a projection plane. The module includes a support, for example, a printed circuit board; and an array of light emitting diodes, especially a linear array of edge-emitting light emitting diodes (EELEDs), extending along the longitudinal direction on the board and operative, when energized, for emitting respective light beams along optical paths generally parallel to the board. Each beam is diffraction-limited along the transverse direction and is non-diffraction-limited along the longitudinal direction.

The module further includes an optical assembly on the board for imaging the array on the projection plane as an image line extending along the longitudinal direction. The optical assembly preferably includes a collimating cylindrical lens having an optical power along the transverse direction, for collimating the beams along the transverse direction, as well as a focusing cylindrical lens having an optical power along the longitudinal direction, for focusing the beams along the longitudinal direction.

A scan mirror is mounted for oscillation relative to the board and is operative for sweeping the image line along the transverse direction, the image line having a plurality of pixels, for example, at least about 160 pixels. A controller is operatively connected to the array and the mirror. The controller is operative for energizing some of the EELEDs to cause their associated pixels to be illuminated and rendered visible, and for deenergizing others of the EELEDs to cause their associated pixels to be non-illuminated. The illuminated and non-illuminated pixels comprise the two-dimensional image being projected.

In accordance with this invention, the use of diodes, rather than lasers, eliminates the speckle noise problem of the prior art. Green light emitting diodes are more prevalent and available as compared to green lasers. The image projected by the diodes of this invention is much brighter than those laser-based projectors of the prior art, because the combined power of hundreds or thousands of diodes is greater than that of one or several lasers. As for compactness, the height along the transverse direction, as considered relative to the board, is minimal, because the diffraction-limited beam collimated by the collimating lens can be focused to one wavelength or less.

The image projection module is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
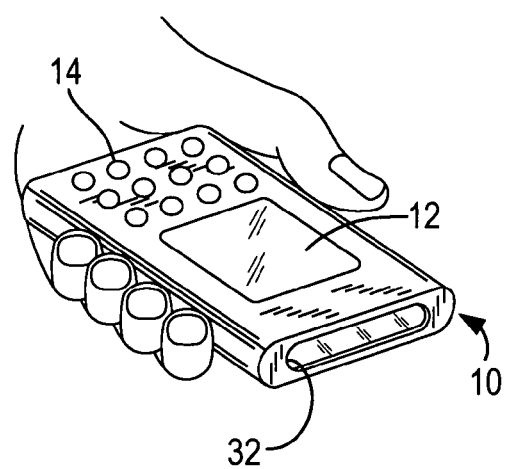
FIG. 1 is a perspective view of a hand-held arrangement for projecting an image in accordance with this invention.

Reference numeral 10 in FIG. 1 generally identifies a hand-held instrument, for example, a personal digital assistant, in which a lightweight, compact, image projection module is mounted and operative for projecting a two-dimensional image extending along mutually orthogonal longitudinal and transverse directions at a projection plane 20 located away from the module. By way of example, a close-in image may be situated relatively close to the instrument, for example, a few inches away (near-zero); and a far-away image may be situated relatively far from the instrument, for example, more than twenty feet away (near-infinity). No matter whether the projected image is near-zero, near-infinity, or at any distance therebetween, the resolution of the image is approximately constant so that the image is sharp and clear and focused anywhere in this extended range of distances.

The parallelepiped shape of the instrument 10 represents just one form factor of a housing in which the module may be implemented. The instrument can be shaped as a pen, a cellular telephone, a clamshell or a wristwatch, just to mention a few preferred form factors.

In the preferred embodiment, the module measures about 30 mm×15 mm×2 mm or less than one cubic centimeter. This compact, miniature size allows the module to be mounted in housings of many diverse shapes, large or small, portable or stationary, including some having an on-board display 12, a keypad 14, and a light-transmissive window or port 32 through which the image is projected.

Figure 2:
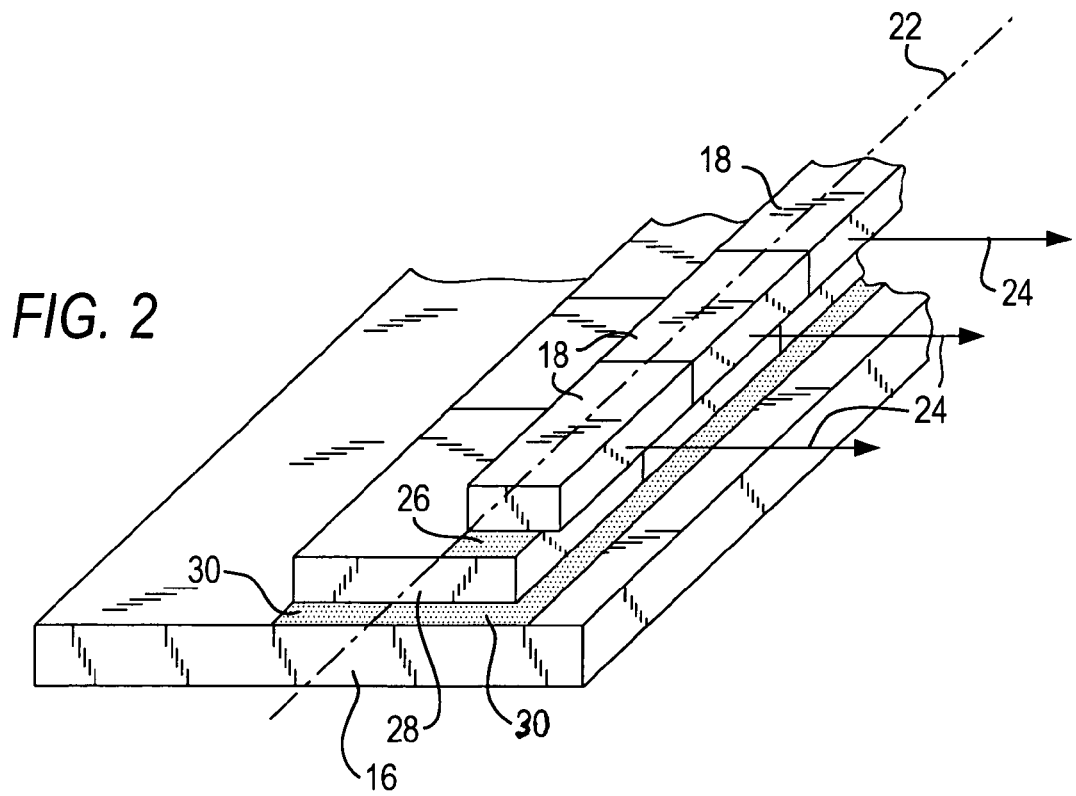
FIG. 2 is an enlarged, broken-away, perspective view of an edge-emitting light emitting diode array on an image projection module in accordance with this invention for installation in the arrangement of FIG. 1.

Referring to FIG. 2, the module includes a support 16, for example, a printed circuit board, and an array of edge-emitting light emitting diodes (EELEDs) 18 mounted on the board in a linear row along the longitudinal direction 22, and operative for emitting respective light beams 24 along optical paths generally parallel to and above the board 16. The EELEDs 18 are preferably mounted by an anisotropic conductive film 26 onto driver integrated circuits 28 which, in turn, are bonded by a die-bonding paste 30 onto the board 16.

Each light beam 24 diverges along the optical paths. As considered along the transverse direction perpendicular to the longitudinal direction 22, each beam 24 is diffraction-limited along the transverse direction and, hence, as explained below, can be focused to one wavelength or less in size. For red, blue and green EELEDs, one wavelength measures about 0.6, 0.4 and 0.5 microns, respectively. As considered along the longitudinal direction 22, each beam 24 is non-diffraction-limited and, hence, can be focused to the size of the diode, i.e., about 20 microns.

Figure 3:
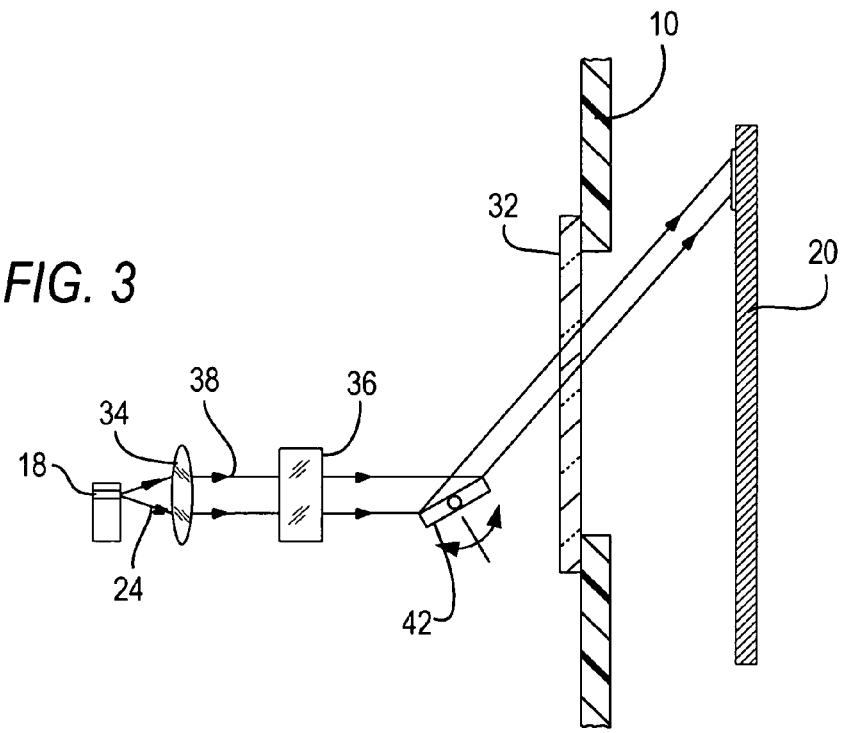
FIG. 3 is a broken-away, side elevational view of the module for use in the arrangement of FIG. 1.
Figure 4:
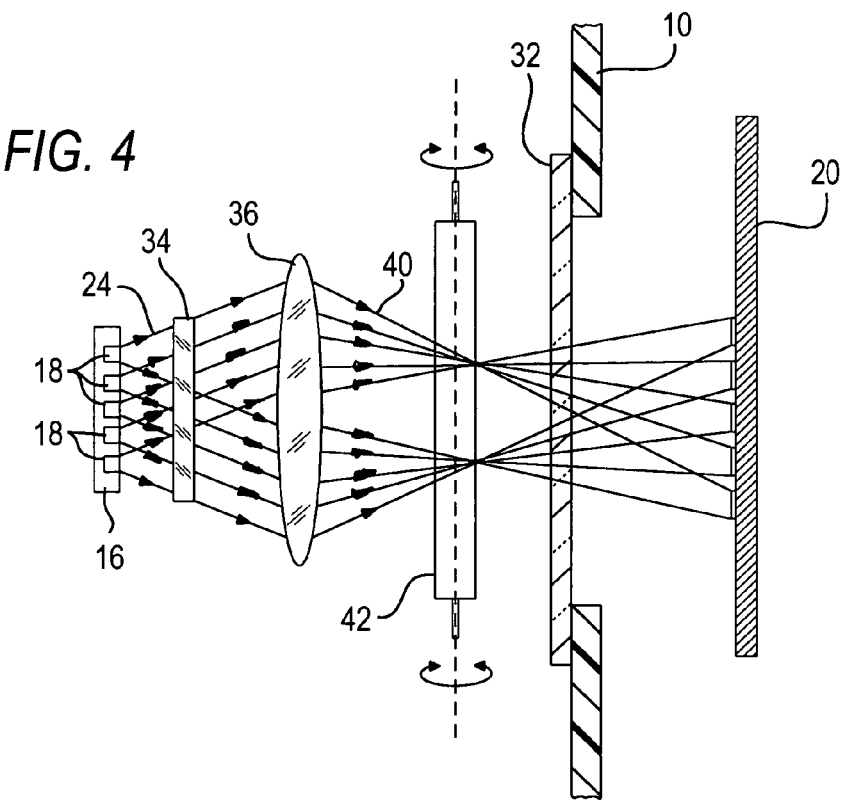
FIG. 4 is top plan view of the module of FIG. 3.

As best seen in FIGS. 3-4, each light beam 24 emitted from the EELEDs 18 passes through an optical assembly including a cylindrical collimating lens 34 and a cylindrical focusing lens 36. Lenses 34, 36 are held by respective lens holders (not illustrated) apart and are fixed in place on the board 16.

Lens 34 has optical power in the transverse direction and collimates the diffraction-limited transverse component of the beam 24 to form a transversely collimated beam 38. The longitudinal component of the beam 24 passes virtually unaffected through the lens 34. Lens 34 is short in height along the transverse direction and has a focal length of about 2 mm.

Lens 36 has optical power in the longitudinal direction and focuses the non-diffraction-limited longitudinal component of the beam 24 to form a longitudinally focused beam 40. The transverse component of the beam 24 passes virtually unaffected through the lens 36. Lens 36 is also short in height along the transverse direction and has a focal length of about 50 mm.

After passage through the lenses 34, 36, the beams are directed to, and reflected off, a scan mirror 42 through the window 32 and onto the projection plane 20, which is preferably a screen, to produce an image line thereon. The mirror 42 is oscillatable by a drive 44 (see FIG. 5) to sweep the image line along the transverse direction to construct the two-dimensional image. The scan rate is on the order of 40-60 Hz which is fast enough to allow the image to persist on a human eye retina without excessive flicker.

Each image line has a number of pixels. The image resolution is preferably VGA quality of 640×480 pixels. In some applications, a one-half VGA quality of 320×480 pixels, or one-fourth VGA quality of 320×240 pixels, is sufficient. At minimum, a resolution of 160×160 pixels is desired.

Figure 5:
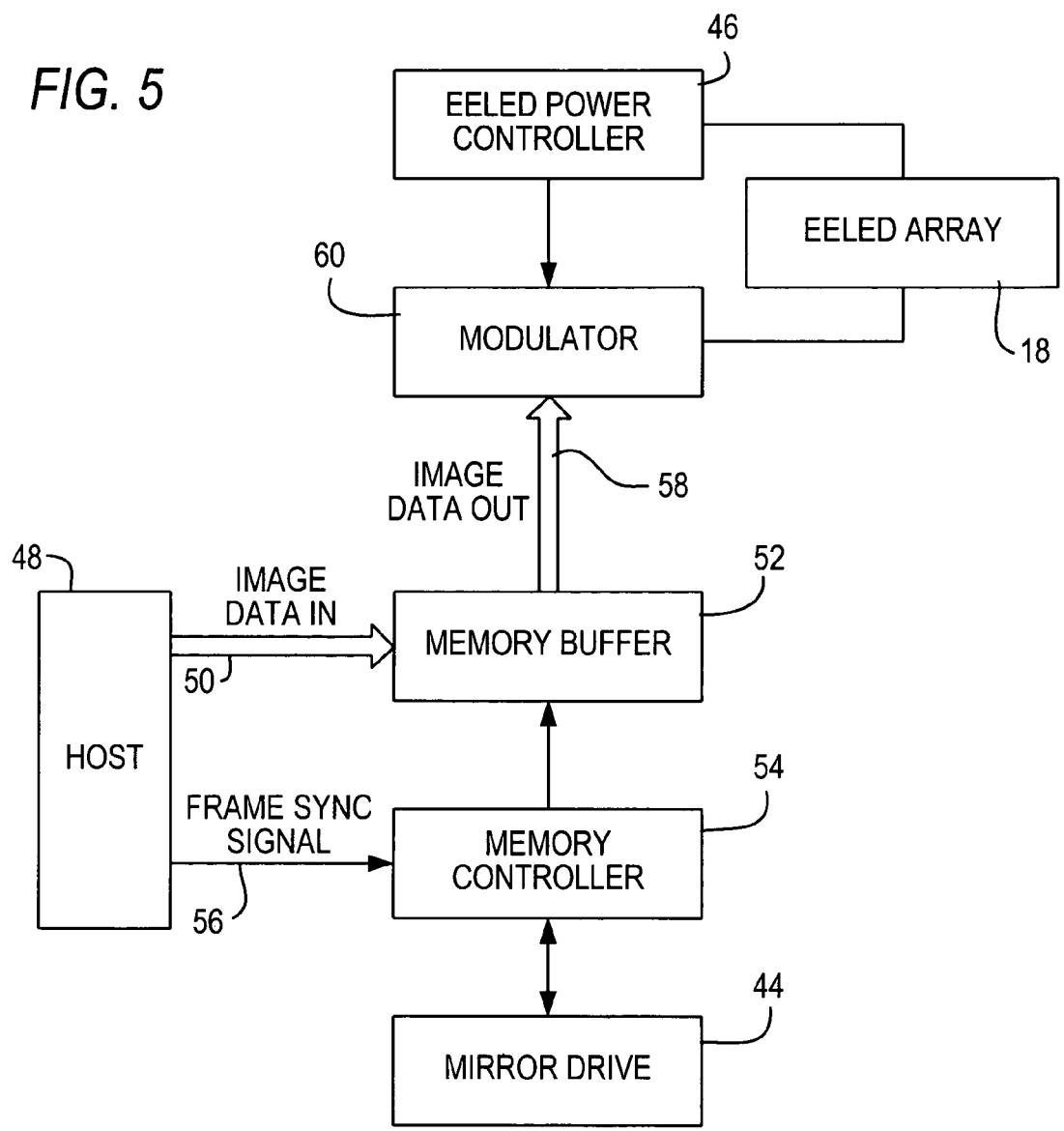
FIG. 5 is an electrical schematic block diagram depicting operation of the module.

The image is constructed by selective illumination of the pixels in one or more of the image lines. As shown in FIG. 5, a power controller 46 energizes selected diodes 18 and causes selected pixels in the image lines to be illuminated, and rendered visible. For example, the power controller 46 conducts an electrical current to the selected diodes 18 to energize the latter to emit light at each selected pixel, and does not conduct an electrical current to other selected diodes 18 to deenergize the latter to non-illuminate the other non-selected pixels. The resulting pattern of illuminated and non-illuminated pixels comprise the image, which can be any display of human-or machine-readable information or graphic.

The image is created in a raster pattern by energizing or pulsing the selected diodes on and off at selected times under control of a microprocessor or control circuit by operation of the power controller 46. The diodes produce visible light and are turned on only when a pixel in the desired image is desired to be seen. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

As shown in FIG. 5, a host 48 sends the bit-mapped image data 50 to a memory buffer 52 which is controlled by a memory controller 54. The storage of one full VGA frame would require about 300 kilobytes, and it would be desirable to have enough memory in the buffer 52 for two full frames (600 kilobytes) to enable one frame to be written by the host, while another frame is being read and projected. On the other hand, if the size of the buffer is smaller than a full frame, then the controller 54 can begin displaying lines after the memory has reached its maximum storage capacity with data sent by the host, or there can be simultaneous reading from and writing to the buffer. A frame synchronization signal 56 is sent by the host to the controller 54.

The scan mirror 42, also known as the Y-axis mirror, is driven by the drive 44 and is controlled by the memory controller 54.

The output of the buffer 52 is a digital signal 58 which is frame-synchronized with the host, and clock-and line-synchronized with the scan mirror 42. This digital signal is sent to a modulator 60 which, in turn, is connected to the array of EELEDs 18.

According to this invention, the module is compact, especially in the transverse direction, thereby imparting a flat profile for the module. Specifically, the lenses 34, 36, the scan mirror 42 and the EELED array 18, as best seen in FIG. 3, are short in height, typically less than 2 mm in height, thereby rendering the module suitable to be fitted in slim form factors.

The image may either be monochrome in which all the illuminated pixels have the same intensity, or may be rendered in gray scale in which the illuminated pixels have a variable intensity. To vary the intensity, the modulator 60 can either vary the time that each pixel is illuminated, or can vary the amount of drive current that is applied to each diode for each pixel.

The image can also be rendered in color by using a plurality of EELED arrays, each of different frequencies, and stacked one above another. If only one diode is energized, then the pixel on the screen will have the color of the energized diode. If two or more diodes of different colors are energized, then the pixel on the screen will have the mixed color of all the energized diodes. Any color in the visible light spectrum can be formed by the selective superimposition of one or more of red, green and blue diodes.

It will be understood that each of the elements described above, or two or more together, also may find a useful application in other types of constructions differing from the types described above.

While the invention has been illustrated and described as embodied in a compact image projection module and arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. An image projection module for projecting a two-dimensional image extending along mutually orthogonal longitudinal and transverse directions at a projection plane, comprising:
   a) a support;
   b) an array of non-laser light emitting diodes extending along the longitudinal direction on the support and operative, when energized, for emitting respective uncollimated light beams diverging along the longitudinal and transverse directions;
   c) an optical assembly on the support for imaging the array on the projection plane as an image line extending along the longitudinal direction by focusing the uncollimated beams along the longitudinal direction and by collimating the uncollimated beams along the transverse direction;
   d) a scanner on the support for sweeping the image line along the transverse direction, the image line having a number of pixels; and
   e) a controller operatively connected to the array and the scanner, for energizing selected ones of the diodes and causing selected ones of the pixels to be illuminated, and rendered visible, by the selected ones of the diodes to produce the two-dimensional image.

2. The image projection module of claim 1, wherein the support is a printed circuit board.

3. The image projection module of claim 2, wherein the light emitting diodes are edge-emitting light emitting diodes (EELEDs) for emitting the uncollimated beams along optical paths generally parallel to the board, each uncollimated beam being diffraction-limited along the transverse direction and being non-diffraction-limited along the longitudinal direction.

4. The image projection module of claim 3, wherein the optical assembly includes a collimating lens having an optical power along the transverse direction for collimating the uncollimated beams, and a focusing lens having an optical power along the longitudinal direction for focusing the uncollimated beams.

5. The image projection module of claim 4, wherein each lens is a cylindrical lens.

6. The image projection module of claim 4, wherein the scanner includes an oscillatable scan mirror for sweeping the image line at a scan rate.

7. The image projection module of claim 1, wherein the controller includes means for energizing the selected ones of the diodes to illuminate the selected ones of the pixels, and for deenergizing others of the diodes to non-illuminate others of the pixels.

8. The image projection module of claim 6, wherein the EELEDs, scan mirror and the lenses have a height along the transverse direction, as measured relative to the board, not exceeding 2 millimeters.

9. A compact image projection module for projecting a two-dimensional image extending along mutually orthogonal longitudinal and transverse directions at a projection plane, comprising:
   a) a printed circuit board;
   b) an array of edge-emitting light emitting diodes (EELEDs) extending along the longitudinal direction on the board and operative, when energized, for emitting respective light beams along optical paths generally parallel to the board, each beam being diffraction-limited along the transverse direction and being non-diffraction limited along the longitudinal direction;
   c) an optical assembly on the board for imaging the array on the projection plane as an image line extending along the longitudinal direction, including a collimating cylindrical lens for collimating the beams along the transverse direction, and a focusing cylindrical lens for focusing the beams along the longitudinal direction;
   d) a scan mirror mounted for oscillating movement relative to the board, for sweeping the image line along the transverse direction, the image line having a number of pixels; and
   e) a controller operatively connected to the array and the mirror, for energizing selected ones of the EELEDs and causing selected ones of the pixels to be illuminated, and rendered visible, by the selected ones of the EELEDs to produce the two-dimensional image.

10. An image projection arrangement for projecting a two-dimensional image extending along mutually orthogonal longitudinal and transverse directions at a projection plane, comprising:
   A) a housing having a light-transmissive port; and
   B) a module mounted in the housing, the module including
      a) a support;
      b) an array of non-laser light emitting diodes extending along the longitudinal direction on the support and operative, when energized, for emitting respective uncollimated light beams diverging along the longitudinal and transverse directions through the port;
      c) an optical assembly on the support for imaging the array on the projection plane as an image line extending along the longitudinal direction by focusing the uncollimated beams along the longitudinal direction and by collimating the uncollimated beams along the transverse direction;

d) a scanner on the support for sweeping the image line along the transverse direction, the image line having a number of pixels; and e) a controller operatively connected to the array and the scanner, for energizing selected ones of the diodes and causing selected ones of the pixels to be illuminated, and rendered visible, by the selected ones of the diodes to produce the two-dimensional image.

11. The image projection arrangement of claim 10, wherein the support is a printed circuit board.

12. The image projection arrangement of claim 11, wherein the light emitting diodes are edge-emitting light emitting diodes (EELEDs) for emitting the uncollimated beams along optical paths generally parallel to the board, each uncollimated beam being diffraction-limited along the transverse direction and being non-diffraction-limited along the longitudinal direction.

13. The image projection arrangement of claim 12, wherein the optical assembly includes a collimating lens having an optical power along the transverse direction for collimating the uncollimated beams, and a focusing lens having an optical power along the longitudinal direction for focusing the uncollimated beams.

14. The image projection arrangement of claim 13, wherein each lens is a cylindrical lens.

15. The image projection arrangement of claim 13, wherein the scanner includes an oscillatable scan mirror for sweeping the image line at a scan rate.

16. The image projection arrangement of claim 10, wherein the controller includes means for energizing the selected ones of the diodes to illuminate the selected ones of the pixels, and for deenergizing others of the diodes to non-illuminate others of the pixels.

17. The image projection arrangement of claim 15, wherein the EELEDs, scan mirror and the lenses have a height along the transverse direction, as measured relative to the board, not exceeding 2 millimeters.

* * * * *